Oct. 11, 1949. A. ZISKA 2,484,777
PLASTIC MOLDING MACHINE
Filed Sept. 1, 1944 6 Sheets-Sheet 2

Inventor:
Adam Ziska
By Chritton, Wiles, Schroeder & Merriam
Attorneys

Oct. 11, 1949.  A. ZISKA  2,484,777
PLASTIC MOLDING MACHINE
Filed Sept. 1, 1944.  6 Sheets-Sheet 3
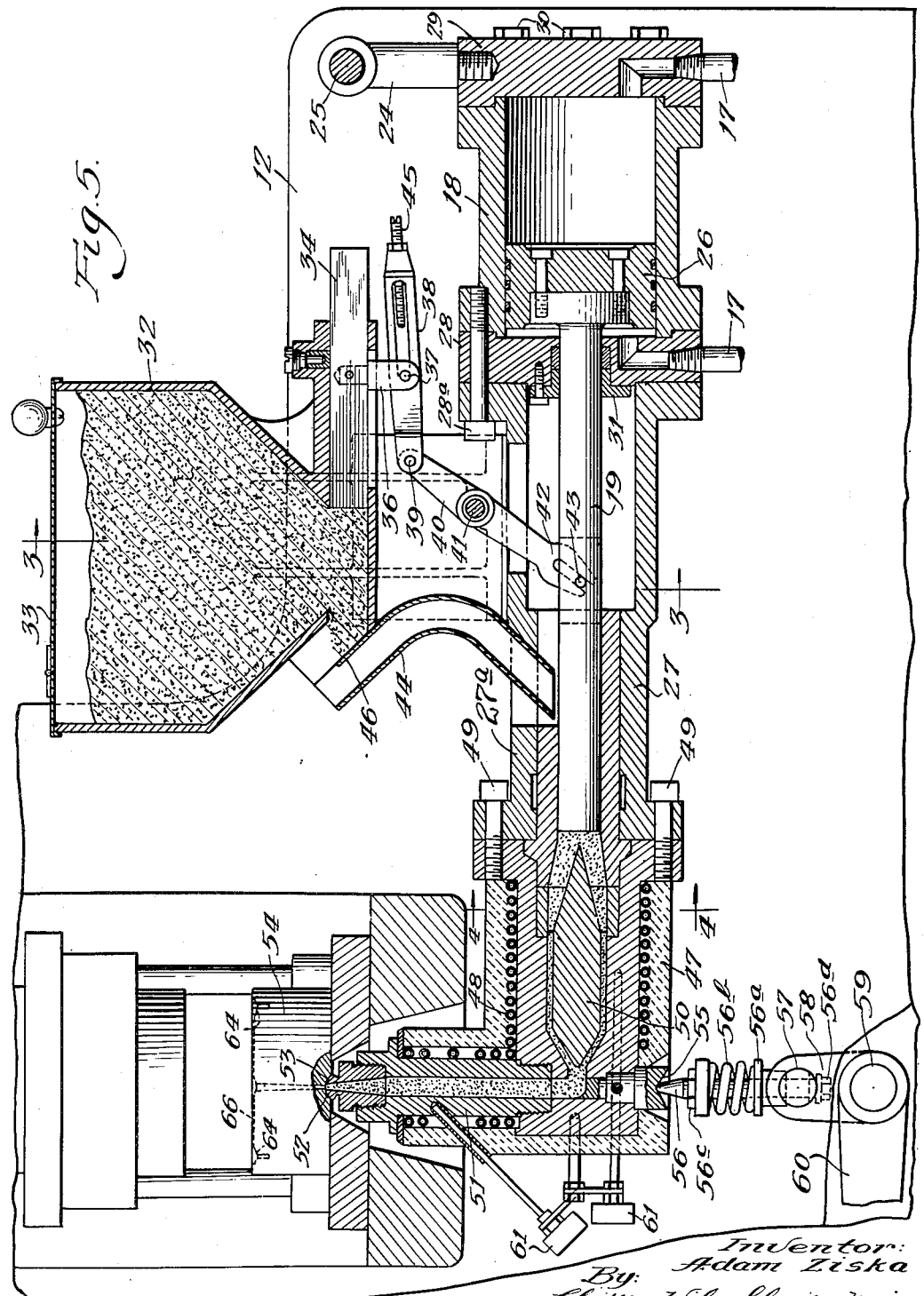

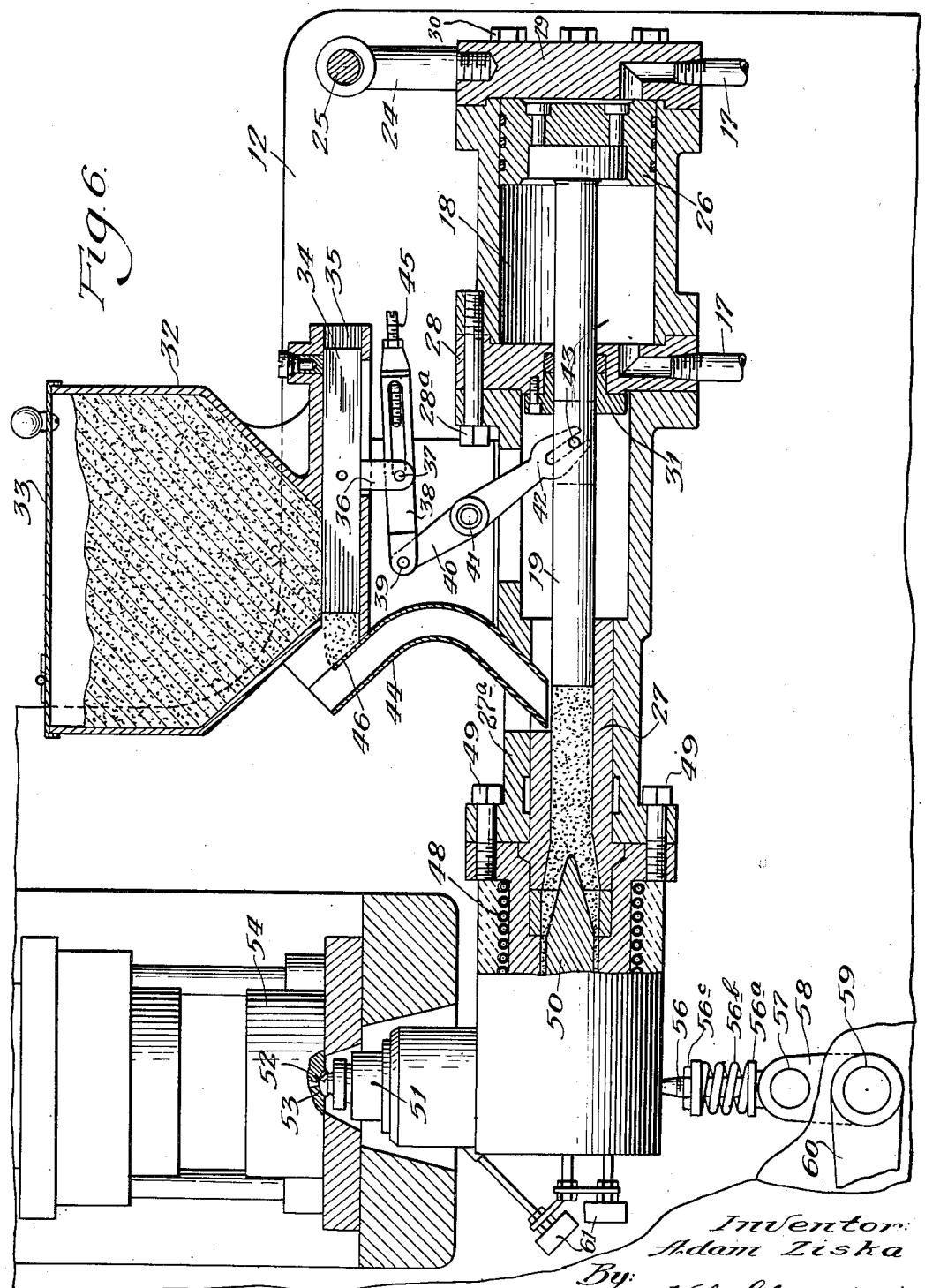

Oct. 11, 1949. A. ZISKA 2,484,777
PLASTIC MOLDING MACHINE
Filed Sept. 1, 1944 6 Sheets-Sheet 5
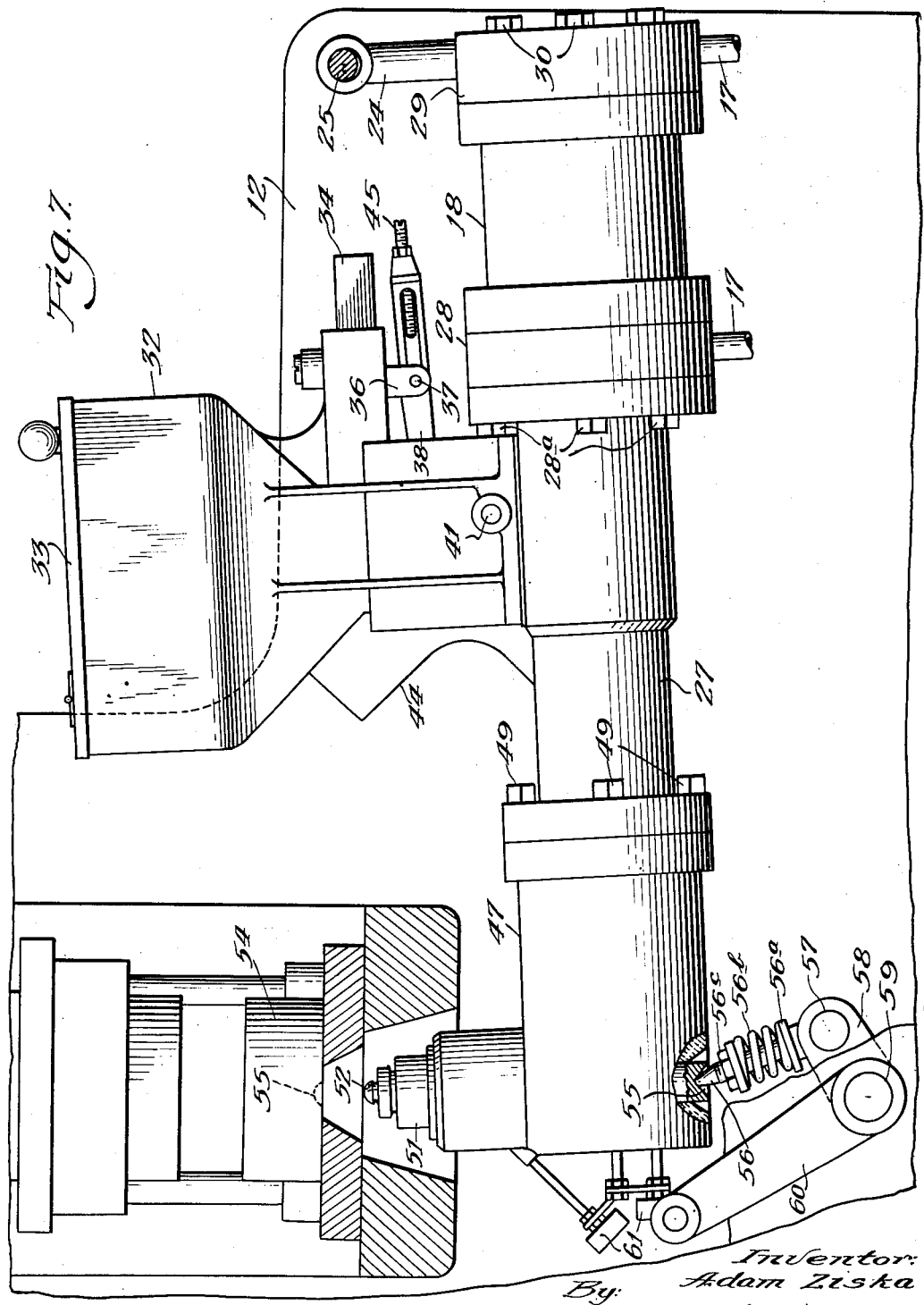
Inventor:
Adam Ziska
By:
Cretton, Wiles, Schroder & Upnian
Attorneys Oct. 11, 1949.  A. ZISKA  2,484,777
PLASTIC MOLDING MACHINE
Filed Sept. 1, 1944   6 Sheets-Sheet 6
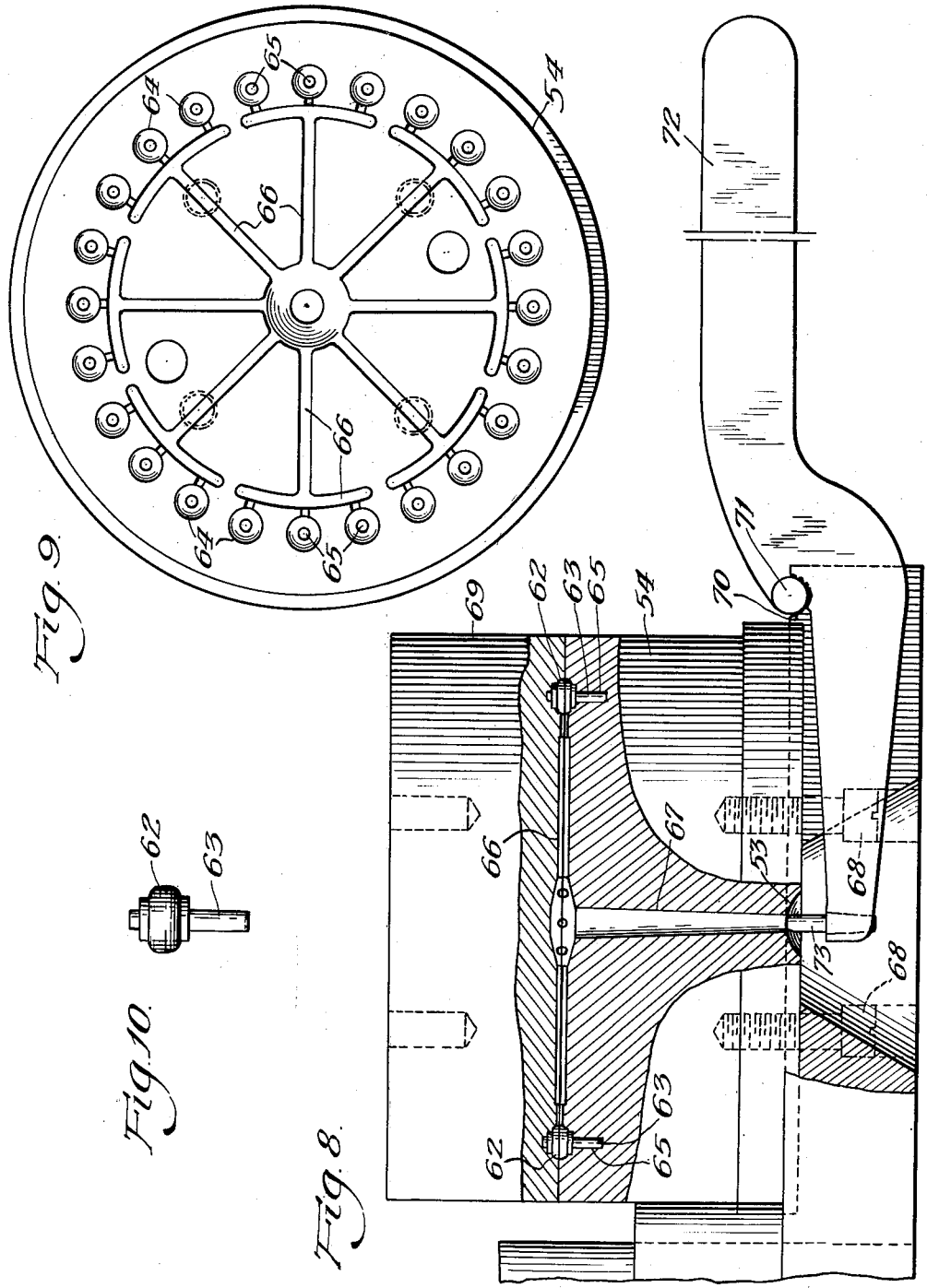
Inventor:
Adam Ziska
By:
Chitton, Wiles, Schroeder & Merriam
Attorneys Patented Oct. 11, 1949

2,484,777

UNITED STATES PATENT OFFICE 2,484,777

PLASTIC MOLDING MACHINE

Adam Ziska, Wauwatosa, Wis., assignor to Ray-O-Vac Company, a corporation of Wisconsin Application September 1, 1944, Serial No. 552,268

10 Claims. (Cl. 18—30)

This invention relates to injection type molding machines for molding plastic material, and more particularly to an improved injection unit and mounting.

The primary object of the invention is to provide an improved machine wherein the molding die is clamped firmly in position and may have its inlet port, which communicates with the discharge port of the injection unit, opened readily if it becomes necessary to force hardened molding material from the die.

A further object of the invention is to provide an improved pivotal mounting for the injection unit, which will enable its discharge port to fit accurately into an inlet port in the molding die and allow for expansion or contraction due to temperature changes.

A further object of the invention is to provide an improved automatic measured feed device on the extrusion unit, and the entire unit may be withdrawn from the machine frame readily for inspection or repairs.

Another object of the invention is to provide an improved automatic feed device for the injection unit, wherein a measured amount of molding powder is dropped by gravity in each operation through an inclined chute so as to first fill the front portion of the compression cylinder.

The invention is illustrated in a preferred embodiment in the accompanying drawings, in which—

Figure 1:
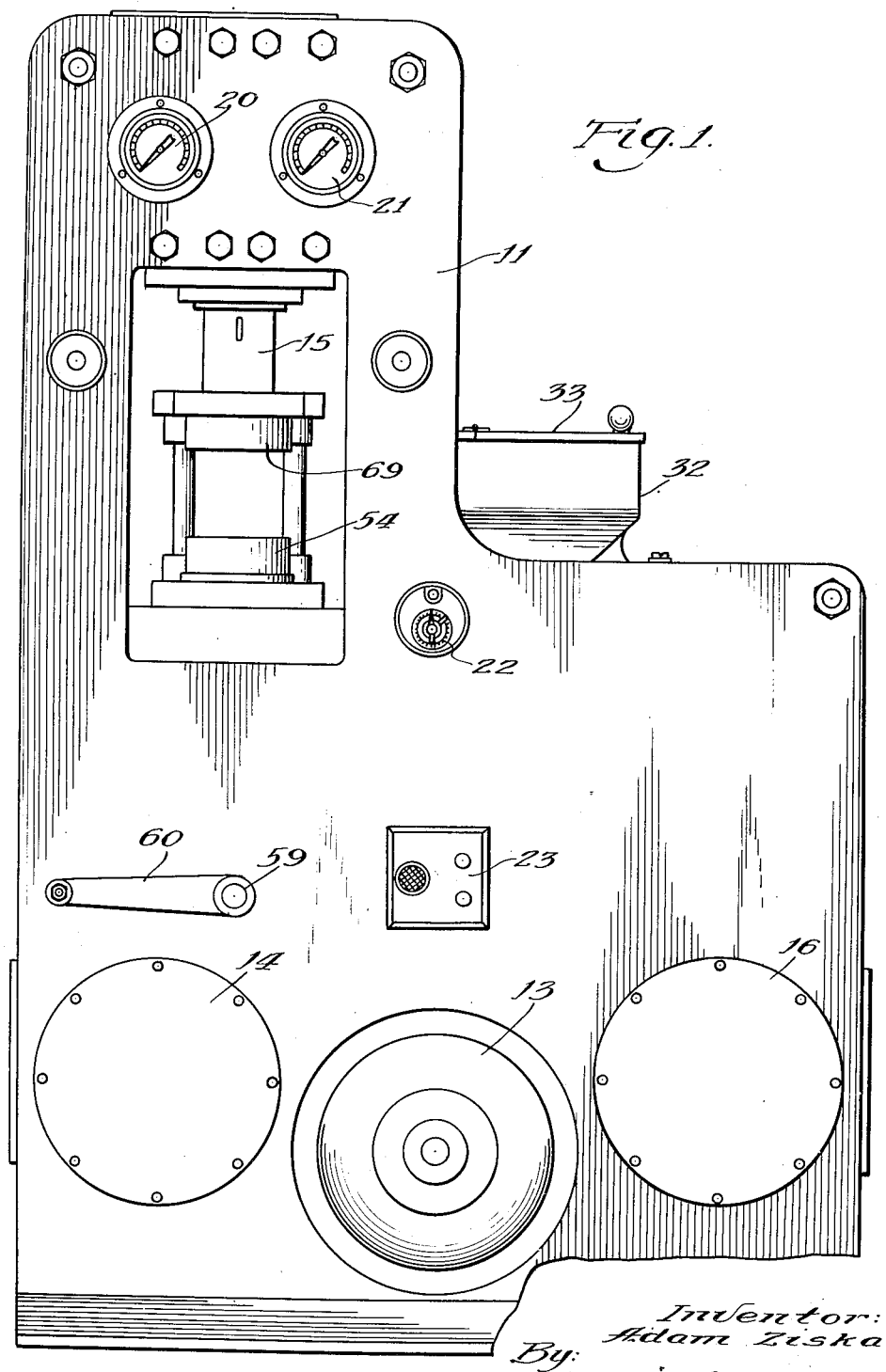
Figure 2:
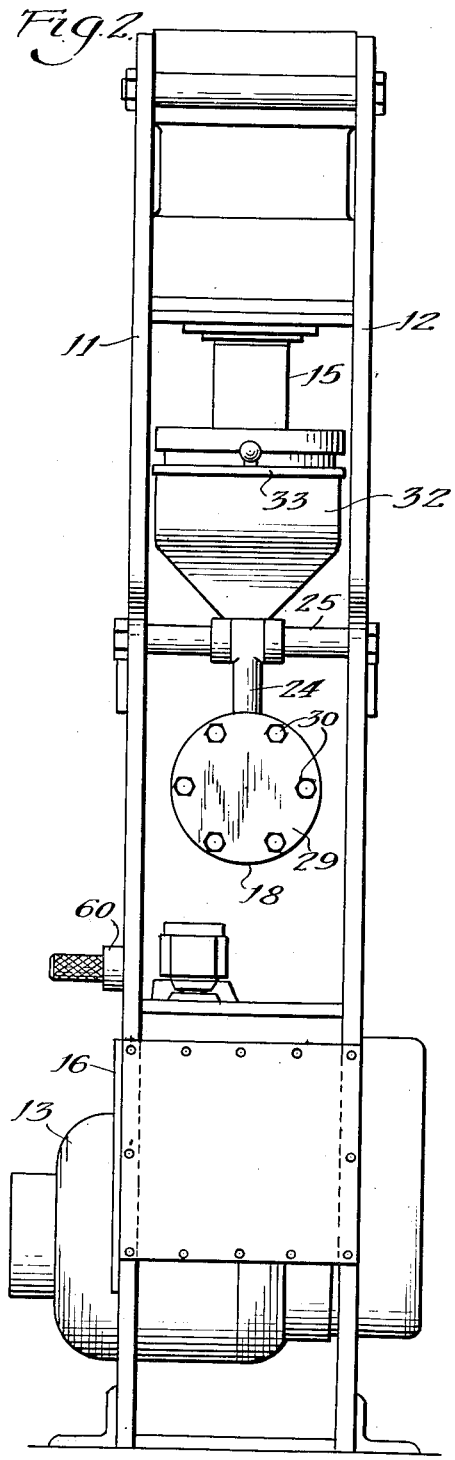
Figure 3:
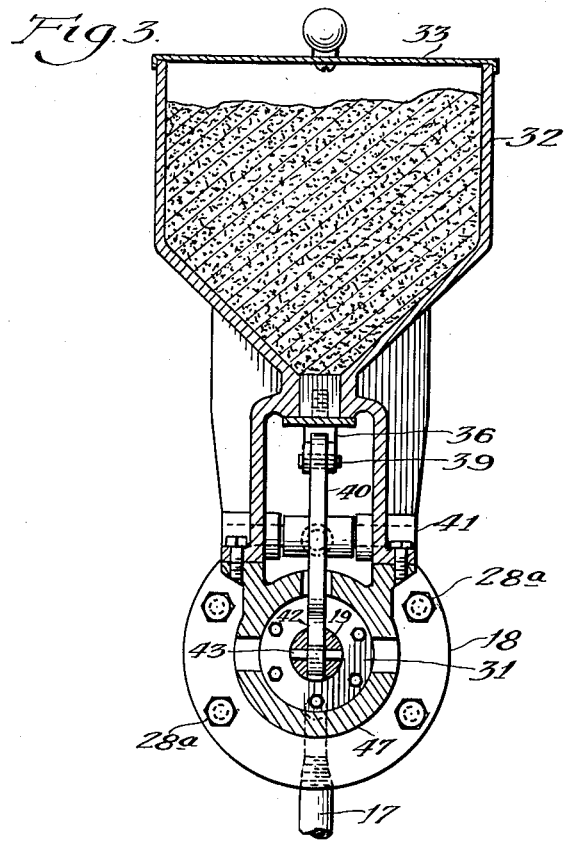
Figure 4:
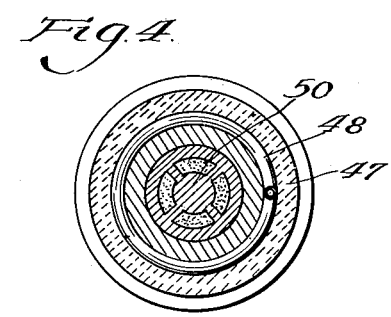

Figure 1 is a front fragmentary elevational view of a molding machine embodying the invention; Fig. 2, an end elevational view of the same taken from the right as viewed in Fig. 1; Fig. 3, a vertical sectional view of the injection unit, taken as indicated at line 3—3 of Fig. 5; Fig. 4, a sectional view taken as indicated at line 4—4 of Fig. 5; Fig. 5, a fragmentary longitudinal sectional view of the injection unit, showing how it fits into the molding die; Fig. 6, a fragmentary sectional view similar to Fig. 5, but showing the ram in retracted position; Fig. 7, a fragmentary elevational view partly in section, showing the extrusion unit swung downwardly to permit access to the molding die; Fig. 8, an enlarged fragmentary view of the die, showing how a tool may be used to pry material out of the die when the extrusion unit is retracted; Fig. 9, a plan view of one half of the molding die; and Fig. 10, an enlarged view of a carbon pencil for a small drycell, whose top closure of plastic material has been molded in the machine illustrated.

In the embodiment illustrated, the main frame has a large front plate 11 and rear plate 12, which are secured together in spaced relation to form a housing for the operating mechanism. Much of the machine is of known construction and will not be described in detail. An electric motor 13 in the base of the machine drives a hydraulic pump at the rear of the plate 14, which raises and lowers the top portion of the die by means of a plunger 15. Another hydraulic pump in the rear of the plate 16 is driven from the motor 13, and has suitable flexible connections 17 with the cylinder 18 of the injection unit, which operates the ram 19.

As shown in Fig. 1, a gauge 20 indicates the clamp pressure of the die, and a gauge 21 indicates the injection pressure on the molding material. A timing device 22 may be provided to regulate the time interval of operation. The electric switch to the pump motor is indicated at 23.

As best shown in Figs. 5, 6 and 7, the injection unit is pivotally supported at its rear end by a hanger 24 which is suspended from a cross-rod 25. Preferably the hole in the hanger is about a sixteenth of an inch larger in diameter than the cross-rod, to permit a slight amount of longitudinal movement. The rear portion of the ram 19 is provided with a double acting piston 26 for reciprocating the ram which extends into the cylinder 27. The rear portion of the front cylinder and head 28 are secured to the cylinder 18 by bolts 28a. The rear cylinder head 29 is secured to the cylinder by bolts 30. A suitable packing joint 31 surrounds the ram 19 and makes a liquid tight connection with the cylinder head 28.

A material hopper 32, provided with a cover 33, is rigidly mounted on the injection unit above its central portion. Its lower portion opens into a measured feed device having a push bar 34 to reciprocate in a square conduit 35. The push bar has a downwardly extending arm 36, provided with a pin 37 which makes a lost motion connection with a slotted control link 38. The control link is pivotally connected at 39 to a rock lever 40 which is mounted on the injection unit at 41, and has a bifurcated end 42 which engages a pin 43 on the ram. Thus it will be understood that rearward movement of the ram 19 will cause a forward feeding movement of the bar 34 to force a measured amount of material from the hopper into the conduit 44. The amount of material fed in each operation may be regulated by an adjusting screw 45, which regulates the length of the slot in the link bar 38.

As the cylinder 27 is horizontally disposed, it is important to project the molding material into the cylinder so that the front end will be filled first. For this purpose a special type of chute 44 has been provided, which communicates with an opening at the rear of the cylinder 27. It will be noted that the rear wall of the conduit extends upwardly above the bottom of the conduit 35, and forms a kind of inclined dam 46, over which the material must travel to enter the chute 44. The chute is elbow-shaped, with its lower end extending downwardly and forwardly towards the rear of the cylinder 27. Thus it will be seen that the material drops under the influence of gravity, and is projected into the cylinder so that its front portion is first filled. By employing gravity, the material always is projected into the cylinder with a substantially uniform velocity. Preferably an annular water cooling chamber 27a is provided to avoid softening of the material in the cylinder 27.

As best shown in Fig. 5, an injection head 47, provided with electrical heating coils 48, is secured to the front of the cylinder 27 by means of bolts 49. The material is forced by the ram around the torpedo shaped member 50, and then travels upwardly through an electrically heated head 51 into a hollow ball-shaped member 52, which fits tightly into a ball-socket 53, provided on the lower side of the molding die 54, which is securely bolted to the frame of the machine. On the opposite side of the head is a pressure socket 55, which is engaged by a pointed plunger 56 slidably mounted on pivot or wrist pin 57, carried by crank 58 on a shaft 59. The shaft 59 is provided in front of the plate 11 with a hand-lever 60, so that the front portion of the injection unit may be swung down out of operating position by raising the hand-lever 60. The plunger 56 is surrounded by a collar 56a, which rests on the wrist pin 57 and bears against a compression spring 56b, which in turn may be compressed by the nut 56c threaded to the plunger. The lower end of the plunger is provided with a nut 56d to prevent it from coming out of the wrist pin 57. By this mechanism an adjustable yielding pressure is provided to force the member 52 into engagement with the socket 53 on the die, and expansion or contraction of the head will not damage the support. Suitable thermo-couples 61 may be provided on the head to indicate the temperatures of the units.

In Figs. 8 and 9 are illustrated the dies for molding plastic closures 62 on small carbon pencils 63, which are used in miniature dry-cells for producing electricity. The die 54 has twenty-four cavities 64, whch are counter-bored as indicated at 65, so that the carbon pencils may be inserted therein. The cavities are gated, as indicated at 66, from a central tapered conduit 67 which terminates at its lower end in the ball-shaped socket 53. The die is secured to the bed of the machine by bolts 68. The upper portion 69 of the die is carried by the hydraulic plunger 15, and is automatically lowered into the position shown in Fig. 8 when the machine is ready to receive plastic material from the injection unit. As shown in Fig. 8, the bed of the machine is provided with upwardly open bearings 70 to receive trunnions 71 of a lever having at one end a handle 72, and at the other end a pin 73 adapted to fit into the bottom of the opening 67 of the die. Thus it will be understood that should plastic material stick in the lower die, the upper portion of the die 69 may be raised, the front end of the injection unit dropped by raising the lever 60, and the tool placed in the bearings and considerable leverage used to press the plastic upwardly.

In the event that it is desired to do any repair work on the injection unit, it is merely necessary to raise the lever 60, disconnect the hydraulic connections 17, take out the cross-rod 25, and the entire unit may be drawn rearwardly out of the frame.

The operation of the machine is as follows:

The upper half of the die may be raised by the plunger 15, and a series of twenty-four carbon pencils placed in the counter-bores 65. The switch 23 is then turned on, and the piston 26 is moved to the position shown in Fig. 6, which will cause the push bar 34 to advance a measured amount of molding powder over the dam 46, and permit it to flow down through the chute 44 into cylinder 27 and fill the opening. The upper die will then be lowered and the forward movement of the piston 26 will force the molding powder through the heating unit and up into the die. During this movement, the feed bar 34 will be retracted for another stroke, and when the die is opened the molded units may be withdrawn from the lower half of the die in one piece, from which they may be separated into single units.

The foregoing detailed description is given for clearness of understanding only, and no unnecessary limitations should be understood therefrom, for some modifications will be obvious to those skilled in the art.

I claim:

1. In a molding machine, a frame, an injection unit swingably supported on the frame of the machine, swingable supporting means for yieldingly holding the discharge end of said unit in operative communication against an extrusion die fixedly mounted in said machine, said supporting means comprising a plunger, a compression spring on said plunger yieldably urging the discharge end of the unit into contact with the die, and a crank pivotally connected to said plunger; said swingable injection unit comprising an injection head, a ram, a hopper above the ram for holding molding powder, a chute for conducting molding powder from the hopper to a position in front of the ram, a cylinder having a piston for operating the ram, and manually operable lever means for swinging the supporting means for moving the discharge end of the unit vertically to and away from said die.

2. In a molding machine, an injection unit swingably supported on the frame of the machine, and supporting means for yieldingly holding the discharge end of said unit in operative communication against a molding die mounted in said machine, said swingable injection unit comprising an injection head, having a laterally extending nozzle, a ram, a hopper above the ram for holding molding powder, a chute for conducting molding powder from the hopper to a position in front of the ram, a cylinder having a piston for operating the ram, said supporting means including a plunger on the opposite side of the injection head from said nozzle, a compression spring on the plunger for urging the plunger toward the injection head, a shaft, and a crank member on said shaft, said plunger being swingably connected with relation to said crank member.

3. In a molding machine, an injection unit swingably supported on the frame of the machine, and supporting means for yieldingly holding the discharge end of said unit in operative communication with an extrusion die fixedly mounted in said machine, said swingable injection unit comprising an injection head, having a laterally extending nozzle, a ram, a hopper above the ram for holding molding powder, a chute for conducting molding powder from the hopper to a position in advance of the ram, a cylinder having a piston for operating the ram, said supporting means including a crank member, a plunger slidably mounted on said crank member, and adjustable spring means for urging the plunger toward that side of the injection head opposite from the nozzle.

4. In a molding machine having a frame, a hollow molding die fixed in said frame, an injection unit comprising an injection head, a hollow member, a ram movable in said hollow member, a hopper above the ram for holding molding power, an elbow-shaped chute connecting the hopper with the hollow member, a cylinder having a piston for operating the ram, said injection unit parts constituting a unitary assembly having its rear portion pivotally supported on the frame, supporting means having means for swinging the discharge end of said unit upwardly against and bodily downwardly away from contact with said die, a measuring conduit extending across the bottom of the hopper, a push bar movable in said conduit, and in inclined dam at the discharge end of said measuring conduit, said inclined dam forming part of said chute and having an upper edge over which the molding powder travels into the chute upon forward movement of the push bar.

5. In a plastic injection molding machine, a frame, a molding die mounted in the frame, an injection unit mounted in said frame and having a substantially horizontal compression cylinder provided with a reciprocatory ram, a hopper above said cylinder for holding a quantity of molding powder, a chute having an upper end inclined toward the molding die and a lower end communicating with the upper rear portion of said cylinder for projecting molding powder from said hopper into the forward portion of the cylinder when the ram is retracted, said compression cylinder, ram, hopper and chute forming a unitary structure swingably mounted on the frame, a measuring conduit extending across the bottom of the hopper to receive molding powder therefrom, a reciprocatory push bar in said conduit for pushing molding powder into the chute, means for reciprocating said push bar in timed relation to movement of the ram, the upper inner end of said chute extending above the bottom of the measuring conduit at one end thereof and forming an inclined dam over which the molding powder is forced in traveling from the measuring conduit into the chute.

6. In a molding machine having a frame, a hollow molding die fixed in said frame and having a spherically curved socket at the end of its inlet opening to receive plastic molding material, an injection unit loosely pivoted on the frame of the machine and provided with a spherically curved nozzle having a discharge conduit adapted to communicate with said inlet opening when inserted in the die, and supporting means for swinging and resiliently holding said nozzle into a position where its outer opening communicates with the inlet opening of said socket, said loose pivot comprising parts movable with relation to each other to impart a slight longitudinal movement to the injection unit to insure correct registry of the nozzle and socket when the injection unit is swung to closed position, said injection unit having a pressure-socket in opposed relation to the nozzle, the supporting means including a pointed plunger adapted to engage said pressure-socket.

7. In a molding machine having a frame, a hollow molding die fixed in said frame and having a spherically curved socket at the end of its inlet opening to receive plastic molding material, an injection unit loosely pivoted on the frame of the machine and provided with a spherically curved nozzle having a discharge conduit adapted to communicate with said inlet opening when inserted in the die, and supporting means for swinging and resiliently holding each nozzle into a position where its outer opening communicates with the inlet opening of said socket, said loose pivot comprising parts movable with relation to each other to impart a slight longitudinal movement to the injection unit to insure correct registry of the nozzle and socket when the injection unit is swung to closed position, said injection unit having a pressure-socket in opposed relation to the nozzle, the supporting means including a manually operable crank member provided with a slidably mounted pointed plunger which has spring means for yieldingly urging said plunger into contact with said pressure-socket.

8. In a plastic injection molding machine having a frame, a hollow molding die mounted in said frame, an injection head, a cylinder having a bore for conducting molding powder to the head, a ram, a molding-powder hopper at a higher level than said ram, a chute between the hopper and the cylinder bore, the head, cylinder, ram, hopper and chute forming a unitary structure, and means for pivotally mounting the unitary structure on the frame, said hopper having in its lower portion a measuring conduit extending parallel to the ram, a push bar movable longitudinally in said conduit, said chute comprising an elbow-shaped open member having an upper portion inclined upwardly and toward the molding die and a lower portion inclined downwardly and toward the injection head, one side of the upper end of said chute extending above the discharge end of the measuring conduit and forming an inclined dam over which the molding powder must travel to enter the chute.

9. In a plastic injection molding machine having a frame, a hollow molding die mounted in the frame, an injection head having a laterally extending nozzle, a cylinder having a bore for conducting molding powder to the head, a ram, a molding powder hopper at a higher level than said ram, a chute between the hopper and the cylinder bore, the head, cylinder, ram, hopper and chute forming a unitary structure, and means for pivotally mounting the unitary structure on the frame, said injection head being formed in its side opposite from the nozzle side with a pressure socket, a lever and a crank member pivoted on the frame, and a plunger pin on the crank member having resilient means for yieldably holding the pin toward said injection head, the end of the pin being seated in the pressure socket to yieldably hold the injection head against the die when the lever is swung in the die-head closing direction.

10. In a molding machine, a frame, a hollow die in the frame, an injection unit swingably mounted on the frame, an injection head in said unit, a hand lever pivoted on the frame and having a crank arm fixed thereto, a plunger pin slidably mounted on the crank arm, a spring on said pin normally but yieldably urging it toward said injection head, the injection head on its lower portion having a depression into which the end of the pin seats to move the injection unit against the die when the lever is moved to closing position.

ADAM ZISKA.

(References on following page)

REFERENCES CITED

The following references are of record in the file of this patent:

UNITED STATES PATENTS

| Number | Name | Date |
|---|---|---|
| 1,466,490 | Swenson | Aug. 28, 1923 |
| 1,476,257 | Kralund et al. | Dec. 4, 1923 |
| 2,262,615 | Lester | Nov. 11, 1941 |
| 2,282,308 | Dahlin | May 12, 1942 |
| 2,349,176 | Kopitke | May 16, 1944 |
| 2,358,956 | Ashbaugh | Sept. 26, 1944 |
| 2,367,204 | Cousino | Jan. 6, 1945 |
| 2,380,536 | MacIntyre | July 31, 1945 |
| 2,396,348 | Sinclair et al. | Mar. 12, 1946 |